United States Patent
Pant et al.

(10) Patent No.: US 10,942,937 B2
(45) Date of Patent: Mar. 9, 2021

(54) DATA MINING SYSTEMS

(71) Applicant: SEAGATE TECHNOLOGY LLC, Cupertino, CA (US)

(72) Inventors: Bhupesh Pant, Maharashtra (IN); Christian B. Madsen, Longmont, CO (US)

(73) Assignee: Seagate Technology LLC, Fremont, CA (US)

( * ) Notice: Subject to any disclaimer, the term of this patent is extended or adjusted under 35 U.S.C. 154(b) by 361 days.

(21) Appl. No.: 15/488,188

(22) Filed: Apr. 14, 2017

(65) Prior Publication Data

US 2018/0300375 A1    Oct. 18, 2018

(51) Int. Cl.
| | |
|---|---|
| *G06F 16/2458* | (2019.01) |
| *G06F 16/22* | (2019.01) |
| *G06F 16/245* | (2019.01) |
| *G06F 16/2455* | (2019.01) |
| *G06F 17/40* | (2006.01) |

(52) U.S. Cl.
CPC .......... *G06F 16/2465* (2019.01); *G06F 16/22* (2019.01); *G06F 16/245* (2019.01); *G06F 16/24565* (2019.01); *G06F 17/40* (2013.01)

(58) Field of Classification Search
CPC .... G06F 16/254; G06F 16/285; G06F 16/444; G06F 3/0484; G06F 16/951; G06F 21/554; G06F 11/0751; G06F 16/24; G06F 21/55; G06F 9/466; G06F 9/542
USPC ........... 707/600–831, 899, 999.001–999.206
See application file for complete search history.

(56) References Cited

U.S. PATENT DOCUMENTS

| | | | |
|---|---|---|---|
| 6,493,761 B1 | 12/2002 | Baker et al. | |
| 7,464,122 B1 | 12/2008 | Basko et al. | |
| 7,653,633 B2 * | 1/2010 | Villella | G06F 11/3476 370/386 |
| 8,364,682 B1 * | 1/2013 | Gershony | G06F 16/9535 707/739 |
| 9,767,040 B2 * | 9/2017 | Pradeep | G06F 12/023 |
| 2004/0254919 A1 | 12/2004 | Guiseppini | |
| 2007/0283194 A1 * | 12/2007 | Villella | G06F 11/3476 714/57 |
| 2010/0257576 A1 * | 10/2010 | Valente | H04L 41/0266 726/1 |
| 2011/0145185 A1 * | 6/2011 | Wang | H04L 41/147 706/52 |
| 2012/0197914 A1 * | 8/2012 | Harnett | G06F 16/332 707/755 |
| 2014/0223462 A1 * | 8/2014 | Aimone | H04N 21/4788 725/10 |
| 2015/0019537 A1 * | 1/2015 | Neels | G06F 16/338 707/722 |
| 2015/0081614 A1 * | 3/2015 | Bechet | G06N 5/027 706/52 |
| 2016/0063255 A1 * | 3/2016 | Jeansonne | G06F 9/4401 713/2 |

* cited by examiner

*Primary Examiner* — Angelica Ruiz
(74) *Attorney, Agent, or Firm* — Mueting Raasch Group (57) ABSTRACT

Systems and methods for improving data mining systems are described. In one embodiment, the systems and methods may include a storage drive and a hardware controller. In some embodiments, the hardware controller may be configured to detect a first event in the storage system, identify data associated with the first event, parse the data according to a logging protocol, and store the parsed data in a database.

19 Claims, 9 Drawing Sheets

DATA MINING SYSTEMS

SUMMARY

The present disclosure is directed to methods and systems for improving data mining systems. In some embodiments, the present systems and methods may implement a structured pattern logging protocol to improve the computational efficiency of data mining systems.

A storage system for improving data mining systems is described. In one embodiment, the storage system device may include a storage drive and a hardware controller. In some embodiments, the hardware controller may be configured to detect a first event in the storage system, identify data associated with the first event, parse the data according to a logging protocol, and store the parsed data in a database. In some cases, the logging protocol may include one or more parameters in a predetermined sequence.

In some cases, parsing the data according to the logging protocol may include at least one of assigning a timestamp to the first event, assigning an event identifier to the first event, determining a state of the first event, determining an event type of the first event, determining a trigger of the first event, and determining a severity associated with the first event, or any combination thereof. In some cases, the state of the first event may include at least one of a start state, an end state, and an intermediary state. In some examples, the intermediary state may be a default state. In some embodiments, the severity associated with the first event may be based at least in part on a degree to which the first event affects an operation of the storage device.

In some embodiments, the hardware controller may be configured to determine a probability of a second event occurring based on the first event occurring. In some cases, the hardware controller may be configured to detect in real time the second event. In some cases, the second event may occur as a result of the first event.

In some embodiments, the hardware controller may be configured to determine a probability of a third event occurring based on the first and second events occurring. In some cases, the hardware controller may be configured to detect in real time the third event. In some cases, the hardware controller may be configured to determine a state of the first event is a start state, a state of the second event is an intermediary state, and a state of the third event is in an end state. In some cases, the first, second, and third events may be referred to as a flow of related events.

In some embodiments, the hardware controller may be configured to determine whether the detected event is included in a predetermined list of events. In some cases, the hardware controller may be configured to bypass the parsing of the data according to the logging protocol and the storing of the parsed data in the database when the detected event is not included in the predetermined list of events.

In some embodiments, the hardware controller may be configured to receive a request with one or more parameters. In some cases, the hardware controller may be configured to identify matching data in the database that corresponds to the one or more parameters of the request based at least in part on the matching data being parsed according to the logging protocol.

A non-transitory computer-readable storage medium storing computer executable instructions to improve a storage system is also described. In some cases, the executable instructions may be executed by a processor associated with the storage system that cause the processor to perform the steps of detecting a first event in the storage system, identifying data associated with the first event, parsing the data according to a logging protocol, and storing the parsed data in a database.

A method for improving data mining systems is also described. In one embodiment, the method may include detecting a first event in the storage system, identifying data associated with the first event, parsing the data according to a logging protocol, storing the parsed data in a database, determining whether the detected event is included in a predetermined list of events, and bypassing the parsing of the data according to the logging protocol and the storing of the parsed data in the database when the detected event is not included in the predetermined list of events.

The foregoing has outlined rather broadly the features and technical advantages of examples according to this disclosure so that the following detailed description may be better understood. Additional features and advantages will be described below. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, including their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following a first reference label with a dash and a second label that may distinguish among the similar components. However, features discussed for various components, including those having a dash and a second reference label, apply to other similar components. If only the first reference label is used in the specification, the description is applicable to any one of the similar components having the same first reference label irrespective of the second reference label.

DETAILED DESCRIPTION

The following relates generally to a structure mining in relation to one or more storage systems. More specifically, the systems and methods include a structured pattern logging protocol for storage systems. The storage systems may include computer systems with storage such as desktop computers, laptop computers, mobile computers, or any combination thereof. Additionally or alternatively, the storage systems may include dedicated storage systems such as storage servers, storage enclosures, cloud storage systems, distributed storage systems, or any combination thereof.

Structure mining or structured data mining, such as graph mining or sequential pattern mining, includes the process of finding and extracting useful information from semi-structured data sets. Sequential pattern mining includes finding statistically relevant patterns between data examples where the values are delivered in a sequence. Some problems in sequence mining lend themselves to discovering frequent itemsets and in some cases the order in which the frequent itemsets or the items of the itemsets appear. For example, by analyzing transactions of customer shopping baskets in a supermarket, one can produce a rule based on a frequent itemset of when a customer buys onions and potatoes together, the customer is likely to also buy hamburger meat in the same transaction. Similarly, by analyzing event logs of storage systems, the present systems and methods may produce a rule based on a frequent itemset of when events A, B, C, and D occur together in that particular order, the storage system is likely to experience a failure of a certain severity.

Data mining is being adopted by many technology companies. In some cases the struggle of data mining may be based on deriving patterns from unstructured data sources. The present systems and methods enables production of structured data, improving upon existing system by reducing noise and size of relevant data sets. In one embodiment, the present systems and methods identify a parent event. In some cases, the present systems and methods map all the related events coming out of the same parent event. In one embodiment, the present systems and methods map the data based on a predetermined syntax. In one example, the syntax may include at least one of a time stamp, a unique event identifier, an event state, an event type, an event trigger or trigger of the current event state, and a severity weight associated with an event or the current event state.

In one embodiment, present systems and methods enable production of structured data that improves data mining efforts. In some embodiments, the present systems and methods implement a structured data logging protocol to reduce the size of relevant datasets being searched, thus reducing the computation load of a computing device to perform a search as well as reducing the time a computing device spends searching datasets. Additionally, the present systems and methods implement a structured data logging protocol to reduce the data mining noise that a conventional system must wade through while searching for relevant data. For instance, unlike the present systems and methods, a conventional system must search through mostly superfluous, non-related data in order to find data relevant to a query.

As an example, a server running a system security software application. The server may be configured to serve security data based on certain entitlements and/or requests. A computing system may request security data from the server. In one embodiment, a computing system may make a request for security data using a hypertext transfer protocol (HTTP) request. The server may then respond to the requests with either the requested security data or an error indicating there was an error with the request and/or an internal error with the server. In some cases, the server may respond with "Internal Error" when the request could not be processed due to any error that the server experiences while processing the request. In some examples, a server may return "Internal Error" indicating an error has resulted from a certain sequence of events. In some cases, the server may send the sequence of events and any related data associated with the sequence of events to the computing device requesting the data. The present systems and methods enable a logical flow of execution and states transformation by using a unique identifier to track transitions. For example, unique identifier may enable the requesting device to identify the sequence of events that leads to the error. The present systems and methods enable a server to map when a particular event has been triggered and when it ends, using a state parameter, for example. Implementing the present systems and methods would enable intelligence built over the logs of security data with relations built between various logs on the server.

In some embodiments, a system may log information based on a predetermined configuration. For example, information may be logged according to a logging protocol of the present systems and methods. The logging protocol may include one or more fields, configuration elements, or parameters. In one embodiment, the parameters of an event included in the logging protocol may include at least one of a timestamp, an event identifier, a state of an event, an event type, a trigger of the event, a severity weight applied to the state that indicates a stability of the given state, or any combination thereof. In some embodiments, one or more parameters may be derived from information associated with an event. In some cases, one or more parameters may be assigned to an event. For example, analysis of the event may determine when the event occurs and as a result a timestamp may be assigned to the event. Similarly, at least one of an event identifier, a state of an event, an event type, a trigger of the event, a severity weight applied to the state that indicates a stability of the given state of an event may be assigned to an event based at least in part on analysis of the event.

In some cases, an identifier may be assigned to the event. In some cases, a sequence of related events may each be assigned the same identifier. In some examples, each event in a sequence of related events may include a unique identifier. In some embodiments, each event of a sequence of related events may include the same group identifier assigned to the sequence. Additionally or alternatively, each event in a sequence of events may include an event identifier that is different for each event in the sequence. In some embodiments, each event stored in a database may include a locally unique or globally unique identifier. Additionally or alternatively, each sequence of events stored in a database may include a locally unique or globally unique identifier.

For systems that implement an event log that includes relevant contextual information hidden within the data, a conventional data mining system must search through a set of unstructured data to derive some pattern related to the relevant contextual information. In one embodiment, the structured data logging protocol includes a logging technique that transforms logging data into a format that improves the efficiency of a computing device to search for and find patterns in events.

Figure 1:
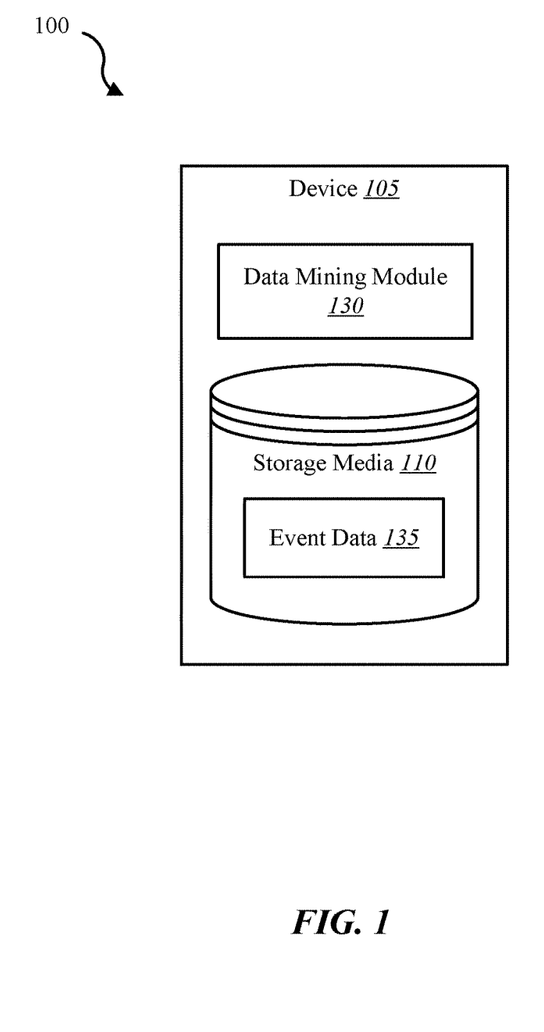
FIG. 1 is a block diagram of an example of a system in accordance with various embodiments.

FIG. 1 is a block diagram illustrating one embodiment of an environment 100 in which the present systems and methods may be implemented. The environment may include device 105 and storage media 110. The storage media 110 may include any combination of hard disk drives, solid state drives, and hybrid drives that include both hard disk and solid state drives. In some embodiment, the storage media 110 may include shingled magnetic recording (SMR)

storage drives. In some embodiments, the systems and methods described herein may be performed on a single device such as device 105. In some cases, the methods described herein may be performed on multiple storage devices or a network of storage devices such a cloud storage system and/or a distributed storage system. Examples of device 105 include a storage server, a storage enclosure, a storage controller, storage drives in a distributed storage system, storage drives on a cloud storage system, storage devices on personal computing devices, storage devices on a server, or any combination thereof. In some configurations, device 105 may include a data mining module 130. In one example, the device 105 may be coupled to storage media 110. In some embodiments, device 105 and storage media 110 may be components of flash memory or a solid state drive. Alternatively, device 105 may be a component of a host of the storage media 110 such as an operating system, host hardware system, or any combination thereof.

In one embodiment, device 105 may be a computing device with one or more processors, memory, and/or one or more storage devices. In some cases, device 105 may include a wireless storage device. In some embodiments, device 105 may include a cloud drive for a home or office setting. In one embodiment, device 105 may include a network device such as a switch, router, access point, or any combination thereof. In one example, device 105 may be operable to receive data streams, store and/or process data, and/or transmit data from, to, or in conjunction with one or more local and/or remote computing devices.

The device 105 may include a database. In some cases, the database may be internal to device 105. In some embodiments, storage media 110 may include a database. Additionally, or alternatively, the database may include a connection to a wired and/or a wireless database. Additionally, as described in further detail herein, software and/or firmware (for example, stored in memory) may be executed on a processor of device 105. Such software and/or firmware executed on the processor may be operable to cause the device 105 to monitor, process, summarize, present, and/or send a signal associated with the operations described herein.

In some embodiments, storage media 110 may connect to device 105 via one or more networks. Examples of networks include cloud networks, local area networks (LAN), wide area networks (WAN), virtual private networks (VPN), a personal area network, near-field communication (NFC), a telecommunications network, wireless networks (using 802.11, for example), and cellular networks (using 3G and/or LTE, for example), or any combination thereof. In some configurations, the network may include the Internet and/or an intranet. The device 105 may receive and/or send signals over a network via a wireless communication link. In some embodiments, a user may access the functions of device 105 via a local computing device, remote computing device, and/or network device. For example, in some embodiments, device 105 may include an application that interfaces with a user. In some cases, device 105 may include an application that interfaces with one or more functions of a network device, remote computing device, and/or local computing device.

In the illustrated example, storage media 110 may include event data 135. In one example, event data 135 may include data associated with events detected in relation to device 105. In some embodiments, event data 135 may include data parsed and stored according to a logging protocol. In some embodiments, event data 135 may include telemetry event data gathered from one or more remote systems. Although the components of device 105 are depicted as being internal to device 105, it is understood that one or more of the components may be external to device 105 and connect to device 105 through wired and/or wireless connections. In some embodiments, device 105 may include one or more applications used to implement one or more aspects of the methods and systems described herein.

In one embodiment, device 105 may generate data each time device 105 determines a certain event occurs and add the generated data to event data 135. In some embodiments, device 105 may process at least a portion of the generated data. In some cases, device 105 may send over a network event data 135 to a remote service processing system to enable the remote service processing system to process at least a portion event data 135. Although system 100 depicts event data 135 from a single device 105, it is understood that event data other than event data 135 may be generated by one or more other systems. Thus, a service processing system may receive event data 135 from device 105 and additional event data from one or more additional devices. In some cases, device 105 may include a server processing system and event data 135 may include telemetry data received from multiple remote systems.

In one embodiment, the storage media 110 may be internal to device 105. As one example, device 105 may include a storage controller that interfaces at least with storage media of storage media 110. In some embodiments, data mining module 130 may monitor events of one or more systems. As one example, data mining module 130 may detect a storage device related event such as an event that affects the operation of a storage device. In some cases, data mining module 130 may detect events that adversely affect the operation of one or more devices. In some embodiments, data mining module 130 may store the detected event in a log that includes multiple detected events. The log may include detected events from a single storage device or events from two or more storage devices. In some embodiments, data mining module 130 may analyze detected events to identify information associated with the detected event. In some cases, data mining module 130 may format the information associated with the detected event according to a logging protocol. In some embodiments, data mining module 130 may store the formatted information in a database. In some cases, data mining module 130 may receive requests from client machines for the data and/or information stored in the database. In some cases, data mining module 130 may determine whether an event is associated with a list of predetermined events. In some cases, data mining module 130 may log a detected event when the detected event matches one or more aspects of an event in the list of predetermined events. Otherwise, data mining module 130 may discard the detected event when an aspect of the detected event does not match any aspect of an event in the list of predetermined events. In some cases, data mining module 130 may identify an event sequence such as event A occurring first, then event B after event A, and then event C after event B. In some cases, data mining module 130 may determine a frequency of an event and/or a sequence of events occurring on a device. In some examples, data mining module 130 may detect a pattern associated with an event or sequence of events such as determining a certain event occurs in relation to a time of day, day of the week, etc. As another example, data mining module 130 may determine a certain event occurs in relation to an operating condition of the device such as determining a certain event occurs in relation to an operating temperature of the device, a processing load of the device, a memory consumption of the device, etc. In some cases, data mining module 130 may determine a probability of a second event occurring after a first event occurs where the first and second events are events in a sequence of events.

Figure 2:
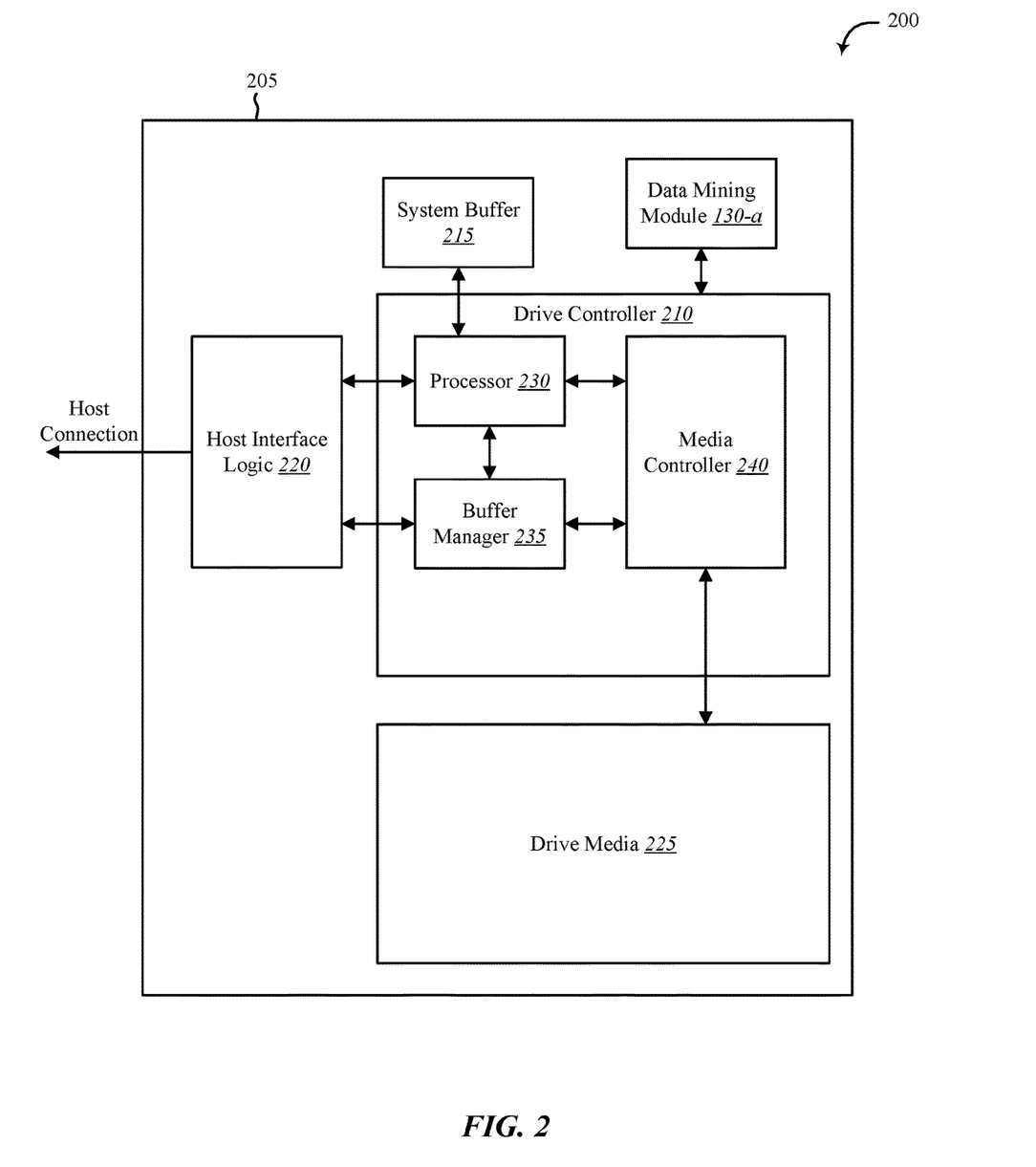
FIG. 2 shows a block diagram of a device in accordance with various aspects of this disclosure.

FIG. 2 shows a block diagram 200 of an apparatus 205 for use in electronic communication, in accordance with various aspects of this disclosure. The apparatus 205 may be an example of one or more aspects of device 105 described with reference to FIG. 1. The apparatus 205 may include a drive controller 210, system buffer 215, host interface logic 220, drive media 225, and data mining module 130-*a*. Each of these components may be in communication with each other and/or other components directly and/or indirectly.

One or more of the components of the apparatus 205, individually or collectively, may be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used such as Structured/Platform ASICs, Field Programmable Gate Arrays (FPGAs), and other Semi-Custom ICs, which may be programmed in any manner known in the art. The functions of each module may also be implemented, in whole or in part, with instructions embodied in memory formatted to be executed by one or more general and/or application-specific processors.

In one embodiment, the drive controller 210 may include a processor 230, a buffer manager 235, and a media controller 240. The drive controller 210 may process, via processor 230, read and write requests in conjunction with the host interface logic 220, the interface between the apparatus 205 and the host of apparatus 205. The system buffer 215 may hold data temporarily for internal operations of apparatus 205. For example, a host may send data to apparatus 205 with a request to store the data on the drive media 225. Drive media 225 may include one or more disk platters, flash memory, any other form of non-volatile memory, or any combination thereof. The driver controller 210 may process the request and store the received data in the drive media 225. In some cases, a portion of data stored in the drive media 225 may be copied to the system buffer 215 and the processor 230 may process or modify this copy of data and/or perform an operation in relation to this copy of data held temporarily in the system buffer 215.

In some embodiments, data mining module 130-*a* may include at least one of one or more processors, one or more memory devices, one or more storage devices, instructions executable by one or more processors stored in one or more memory devices and/or storage devices, or any combination thereof. Although depicted outside of drive controller 210, in some embodiments, data mining module 130-*a* may include software, firmware, and/or hardware located within drive controller 210 and/or operated in conjunction with drive controller 210. For example, data mining module 130-*a* may include at least a portion of processor 230, buffer manager 235, and/or media controller 240. In one example, data mining module 130-*a* may include one or more instructions executable by processor 230, buffer manager 235, and/or media controller 240.

Figure 3:
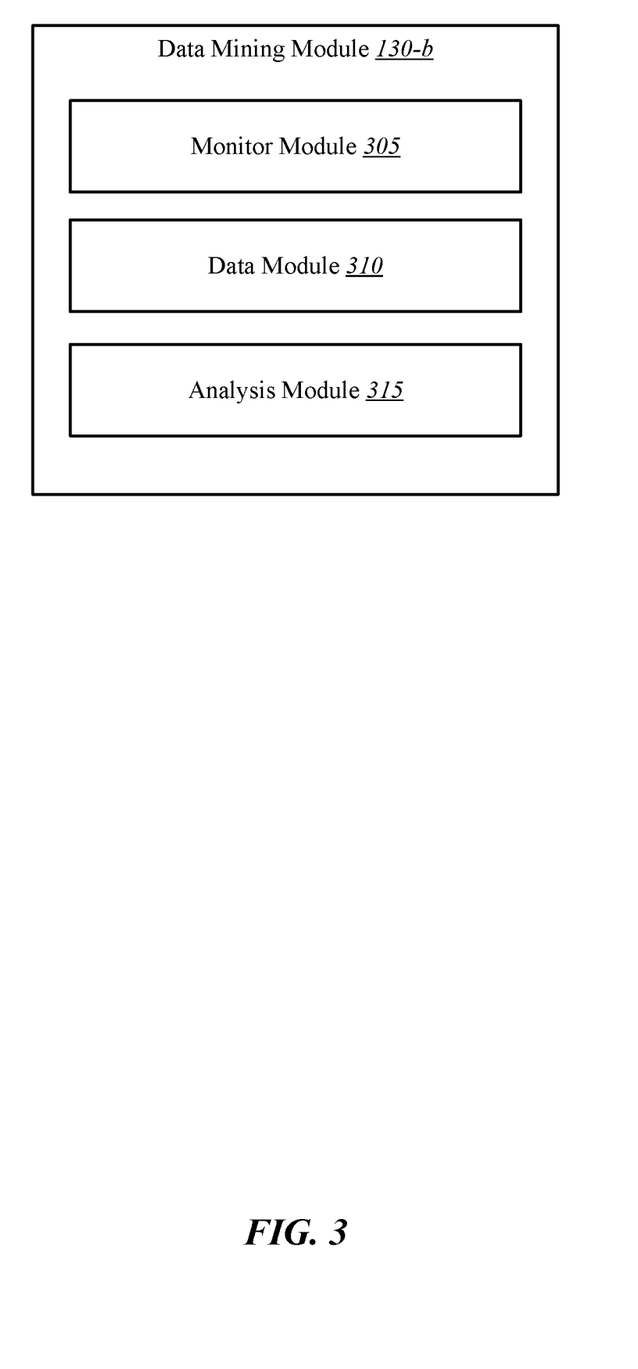
FIG. 3 shows a block diagram of one or more modules in accordance with various aspects of this disclosure.

FIG. 3 shows a block diagram of a data mining module 130-*b*. The data mining module 130-*b* may include one or more processors, memory, and/or one or more storage devices. The data mining module 130-*b* may include monitor module 305, data module 310, and analysis module 315. The data mining module 130-*b* may be one example of data mining module 130 of FIGS. 1 and/or 2. Each of these components may be in communication with each other.

In one embodiment, monitor module 305 may be configured to detect a first event of a monitored system. In one example, the monitored system may include a storage system. Examples of the storage system may include storage of a computing device, a storage server, a storage enclosure with multiple storage drives, a cloud storage system, a distributed data storage system, or any combination thereof. In some embodiments, monitor module 305 may be configured to detect in real time a second event in relation to a first event occurring on an associated system. In some cases, the second event may occur as a result of the first event.

In one embodiment, data module 310 may be configured to identify data associated with the first event. In some cases, data module 310 may identify circumstances coinciding with an event. Additionally or alternatively, data mining module 310 may identify one or more properties of an event. For example, when an event includes initiation of a first process, identifying properties of the event may include identifying at least one of a name or identifier of the first process, a file name associated with the first process, a timestamp of when the first process was initiated, a name or identifier of a machine that initiated the first process, a name or identifier of a second process that initiated the first process, a condition that instigated initiation of the first process, or any combination thereof.

In some embodiments, data module 310 may be configured to parse the data according to a logging protocol. In some cases, the logging protocol may include a structured pattern logging protocol. In some cases, the logging protocol may include one or more parameters in a predetermined sequence. For example, the logging protocol may include N fields in a particular order from a first field to the Nth field. In some cases, data associated with an event may be parsed according to the N fields and stored in a database. In some cases, the data parsed into the N fields may be stored and/or presented in a user interface in the particular order from the first field to the Nth field.

In some embodiments, data module 310 parsing the data according to the logging protocol may include at least one of data module 310 assigning a timestamp to a first event, assigning an event identifier to the first event, determining a state of the first event, determining an event type of the first event, determining a trigger of the first event, and determining a severity associated with the first event or a state of the first event, or any combination thereof. In some cases, data module 310 may identify related events. In some examples, data module 310 may assign the same identifier or a similar identifier to related events. For example, data module 310 may identify a parent event as a start event, one or more intermediary events that occur as a result of the parent event, and an end event. In some cases, the start event, intermediary events, and end event may be referred to as a sequence of events. In some cases, data module 310 may assign a sequence identifier to the sequence of events. In some cases, data module 310 may assign the same sequence identifier to each event in the sequence of events. Additionally or alternatively, data module 310 may assign a different event identifier to each event in the sequence of events. In some cases, each event identifier may include a prefix identifier that is the same for each event in the sequence that is combined with a suffix identifier that is unique to each event in the sequence.

In some embodiments, data module 310 may assign a severity to at least one of an event, a state of an event, and a sequence of events, or any combination thereof. In some cases, data module 310 may assign a severity to an event based on how the event adversely affects an operation of a related system. In some cases, a severity associated with an event may be based at least in part on a degree to which the event adversely affects an operation of an associated storage device. In some cases, the adverse condition may include an abnormal operation of a related storage system, an abnormal operating condition of the storage system, a hardware failure, a software bug, a firmware bug, unavailability of the storage system, a loss or corruption of data stored on the storage system, a loss of data access to read and/or write data to the storage system, or any combination thereof. For example, a minor glitch or adverse condition that does not affect the integrity, availability, or access of a system or associated data may be given a relatively low severity rating. On the other hand, an adverse condition that affects availability to the system and/or data may be given a relatively high severity rating. In some examples, an intermittent anomaly or a minor temperature fluctuation that does not satisfy a critical temperature threshold may be given a low severity. In some examples, a repetitive anomaly affecting data and/or system availability, a data read error, a data write error, or a temperature fluctuation that satisfies a non-critical temperature threshold may be given a medium severity. In some examples, adverse conditions such as data loss, system unavailability, an operating temperature that satisfies a critical temperature threshold may be given a high severity. Accordingly, data module 310 may assign a high severity to an event or sequence of events that results in or is associated with a critical error such as device failure, loss of data, or loss of access to an associated storage system. Similarly, data module 310 may assign a low severity to an event that is an intermittent anomaly that does not result in a critical error or does not adversely affect operation of a related system.

In some embodiments, the state of the first event may include at least one of a start state, an end state, and an intermediary state. In some cases, an intermediary state may be referred to as an in process state. A sequence of events such as a start state, one or more intermediary states, and an end state may be referred to as a flow of related events. In some cases, the intermediary state may be a default state. In some examples, data module 310 may analyze an event to identify a state of the event. As one example, data module 310 may identify an event as a parent event in a sequence of events or flow of related events. Accordingly, data module 310 may identify the parent event as a start state of a flow of related events. In some cases, an event may include multiple states. For example, a single event may include a start state of the event, intermediary states of the event, and an end state of the same single event. Accordingly, data module 310 may identify each state of an event as the event transitions from state to state. In some cases, data module 310 may associate a timestamp with each state and/or each transition from one state to another state.

In some embodiments, data module 310 may be configured to store the parsed data in a database. In some cases, the database may be associated with a storage system. For example, the databased may include storage media associated with at least one of a computing device, a storage server, a storage enclosure, a cloud storage system, a distributed storage system, or any combination thereof. In some embodiments, data module 310 may identify events, parse information about identified events according to the logging protocol, and store the parse information on a storage medium of a database. In some cases, data module 310 may query the database based on requests for data stored in the database such as requests received from client machines.

In some embodiments, analysis module 315 may be configured to determine a probability of a second event occurring based on the first event occurring. In some embodiments, analysis module 315 may be configured to determine a probability of a third event occurring based on the first and second events occurring. In some embodiments, monitor module 305 may be configured to detect in real time the third event in relation to the storage system.

In some embodiments, based on analysis of multiple events over a certain period of time analysis module 315 may identify patterns associated with events and/or sequence of events. Accordingly, based on this analysis, analysis module 315 may identify probabilities that a first event may result in a second event. For instance, analysis module 315 may determine that event A can transition only into event E, event N, or event S. As one example, analysis module 315 may determine that the occurrence of event A has a 55% chance of transitioning to event N, a 30% chance of transitioning to event E, and a 15% chance of transitioning to event S. Accordingly, upon detecting the occurrence of event A analysis module 315 may indicate the associated probabilities determined by the prior analysis. Upon identifying an unanalyzed or unclassified sequence of events, analysis module 315 may analyze multiple occurrences of the sequence of events to determine a probability of a parent event of the analyzed sequence of events resulting in the occurrence of the next subsequent event in that sequence of events. For example, analysis module 315 may identify a previously unknown sequence of events such as {event J, event A, event Y, and event M}. Accordingly, analysis module 315 may determine that event A has a 37% chance of occurring upon the occurrence of event J, that event Y has a 12% chance of occurring upon the occurrence of event A, and that event M has a 53% chance of occurring upon the occurrence of event Y, etc.

In some embodiments, analysis module 315 may be configured to determine a state of an event. For example, analysis module 315 may analyze an event to determine whether the event is in a start state, an intermediary state, or an end state. As one example, analysis module 315 may determine a first state is a start state, a state of the second event is an intermediary state, and a state of the third event is in an end state. In some cases, the first, second, and third events may be referred to as a flow of related events.

In some embodiments, analysis module 315 may be configured to determine whether the detected event is included in a predetermined list of events. In some embodiments, data module 310 may be configured to bypass the parsing of the data related to the event according to the logging protocol and the storing of the parsed data in the database when the detected event is not included in the predetermined list of events. For example, an administrator may indicate which events are to be logged and which events are to be ignored. In some cases, data module 310 may log events based on a frequency of occurrence and/or a severity associated with an event. For example, events that satisfy a frequency threshold may be logged while those that do not satisfy the threshold are discarded. Similarly, an event may be logged based on satisfying a severity threshold, while those that do not satisfy the severity threshold are discarded because such events do not adversely affect an operating condition of an associated system.

In some embodiments, data module 310 may be configured to detect and receive a request from a client machine. In some cases, the request may include one or more parameters included in the request. In some cases, the request may include a hypertext transfer protocol (HTTP) request sent by a client machine.

In some cases, analysis module 315 may be configured to process the request. In one embodiment, analysis module 315 may analyze the request to identify one or more aspects of the request such as one or more parameters included in the request. In some cases, the parameters of the request may include parameters related to data stored in a database. In some examples, the request may include a request for data parsed according to the logging protocol and stored in a database of a storage system. In some embodiments, analysis module 315 may be configured to identify matching data in the database that corresponds to the one or more parameters of the request based at least in part on the matching data being parsed according to the logging protocol. Accordingly, analysis module 315 processing the request may include analysis module 315 identifying one or more parameters of the request and performing a query of parsed data stored in a database according to the parameters provided in the request. For example, a request may specify one or more event types. Accordingly, analysis module 315 may identify the event types include in the request and perform a query of the database based on the identified event types. Upon finding matching parsed data associated with one or more events and/or sequence of events, analysis module 315 may return the matching parsed data and data module 310 may communicate the matching data to the client machine that made the request.

Figure 4:
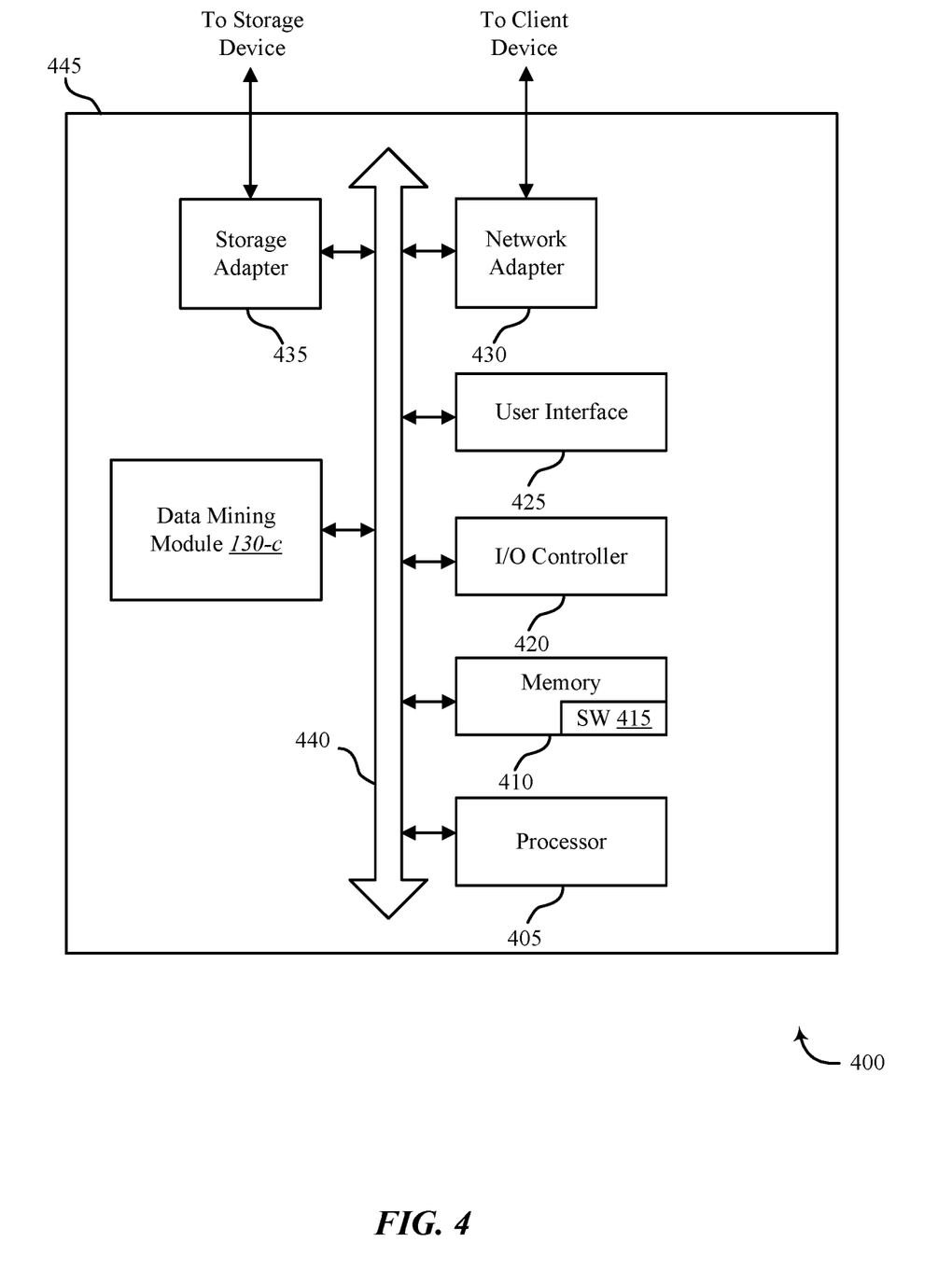
FIG. 4 shows a diagram of a system in accordance with various aspects of this disclosure.

FIG. 4 shows a system 400 for improving data mining systems, in accordance with various examples. System 400 may include an apparatus 445, which may be an example of any one of device 105 of FIG. 1 and/or device 205 of FIG. 2.

Apparatus 445 may include components for bi-directional voice and data communications including components for transmitting communications and components for receiving communications. For example, apparatus 445 may communicate bi-directionally with one or more storage devices and/or client systems. This bi-directional communication may be direct (apparatus 445 communicating directly with a storage system, for example) and/or indirect (apparatus 445 communicating indirectly with a client device through a server, for example).

Apparatus 445 may also include a processor module 405, and memory 410 (including software/firmware code (SW) 415), an input/output controller module 420, a user interface module 425, a network adapter 430, and a storage adapter 435. The software/firmware code 415 may be one example of a software application executing on apparatus 445. The network adapter 430 may communicate bi-directionally, via one or more wired links and/or wireless links, with one or more networks and/or client devices. In some embodiments, network adapter 430 may provide a direct connection to a client device via a direct network link to the Internet via a POP (point of presence). In some embodiments, network adapter 430 of apparatus 445 may provide a connection using wireless techniques, including digital cellular telephone connection, Cellular Digital Packet Data (CDPD) connection, digital satellite data connection, and/or another connection. The apparatus 445 may include a data mining module 130-c, which may perform the functions described above for the data mining module 130 of FIGS. 1, 2, and/or 3.

The signals associated with system 400 may include wireless communication signals such as radio frequency, electromagnetics, local area network (LAN), wide area network (WAN), virtual private network (VPN), wireless network (using 802.11, for example), cellular network (using 3G and/or LTE, for example), and/or other signals. The network adapter 430 may enable one or more of WWAN (GSM, CDMA, and WCDMA), WLAN (including BLUETOOTH® and Wi-Fi), WMAN (WiMAX) for mobile communications, antennas for Wireless Personal Area Network (WPAN) applications (including RFID and UWB), or any combination thereof.

One or more buses 440 may allow data communication between one or more elements of apparatus 445 such as processor module 405, memory 410, I/O controller module 420, user interface module 425, network adapter 430, and storage adapter 435, or any combination thereof.

The memory 410 may include random access memory (RAM), read only memory (ROM), flash memory, and/or other types. The memory 410 may store computer-readable, computer-executable software/firmware code 415 including instructions that, when executed, cause the processor module 405 to perform various functions described in this disclosure. Alternatively, the software/firmware code 415 may not be directly executable by the processor module 405 but may cause a computer (when compiled and executed, for example) to perform functions described herein. Alternatively, the computer-readable, computer-executable software/firmware code 415 may not be directly executable by the processor module 405, but may be configured to cause a computer, when compiled and executed, to perform functions described herein. The processor module 405 may include an intelligent hardware device, for example, a central processing unit (CPU), a microcontroller, an application-specific integrated circuit (ASIC), field programmable gate array (FPGA), or any combination thereof.

In some embodiments, the memory 410 may contain, among other things, the Basic Input-Output system (BIOS) which may control basic hardware and/or software operation such as the interaction with peripheral components or devices. For example, at least a portion of the data mining module 130-c to implement the present systems and methods may be stored within the system memory 410. Applications resident with system 400 are generally stored on and accessed via a non-transitory computer readable medium, such as a hard disk drive or other storage medium. Additionally, applications can be in the form of electronic signals modulated in accordance with the application and data communication technology when accessed via a network interface such as network adapter 430.

Many other devices and/or subsystems may be connected to and/or included as one or more elements of system 400 (for example, a personal computing device, mobile computing device, smart phone, server, internet-connected device, cell radio module, or any combination thereof). In some embodiments, all of the elements shown in FIG. 4 need not be present to practice the present systems and methods. The devices and subsystems can be interconnected in different ways from that shown in FIG. 4. Code to implement the present disclosure may be stored in a non-transitory computer-readable medium such as one or more of system memory 410 or other memory. The operating system provided on I/O controller module 420 may be a mobile device operation system, a desktop/laptop operating system, or another known operating system.

The I/O controller module 420 may operate in conjunction with network adapter 430 and/or storage adapter 435. The network adapter 430 may enable apparatus 445 with the ability to communicate with client devices such as device 105 of FIG. 1, and/or other devices over a communication network. Network adapter 430 may provide wired and/or wireless network connections. In some cases, network adapter 430 may include an Ethernet adapter or Fibre Channel adapter. Storage adapter 435 may enable apparatus 445 to access one or more data storage devices such as storage device 110. The one or more data storage devices may include two or more data tiers each. The storage adapter 445 may include one or more of an Ethernet adapter, a Fibre Channel adapter, Fibre Channel Protocol (FCP) adapter, a SCSI adapter, and iSCSI protocol adapter.

Figure 5:
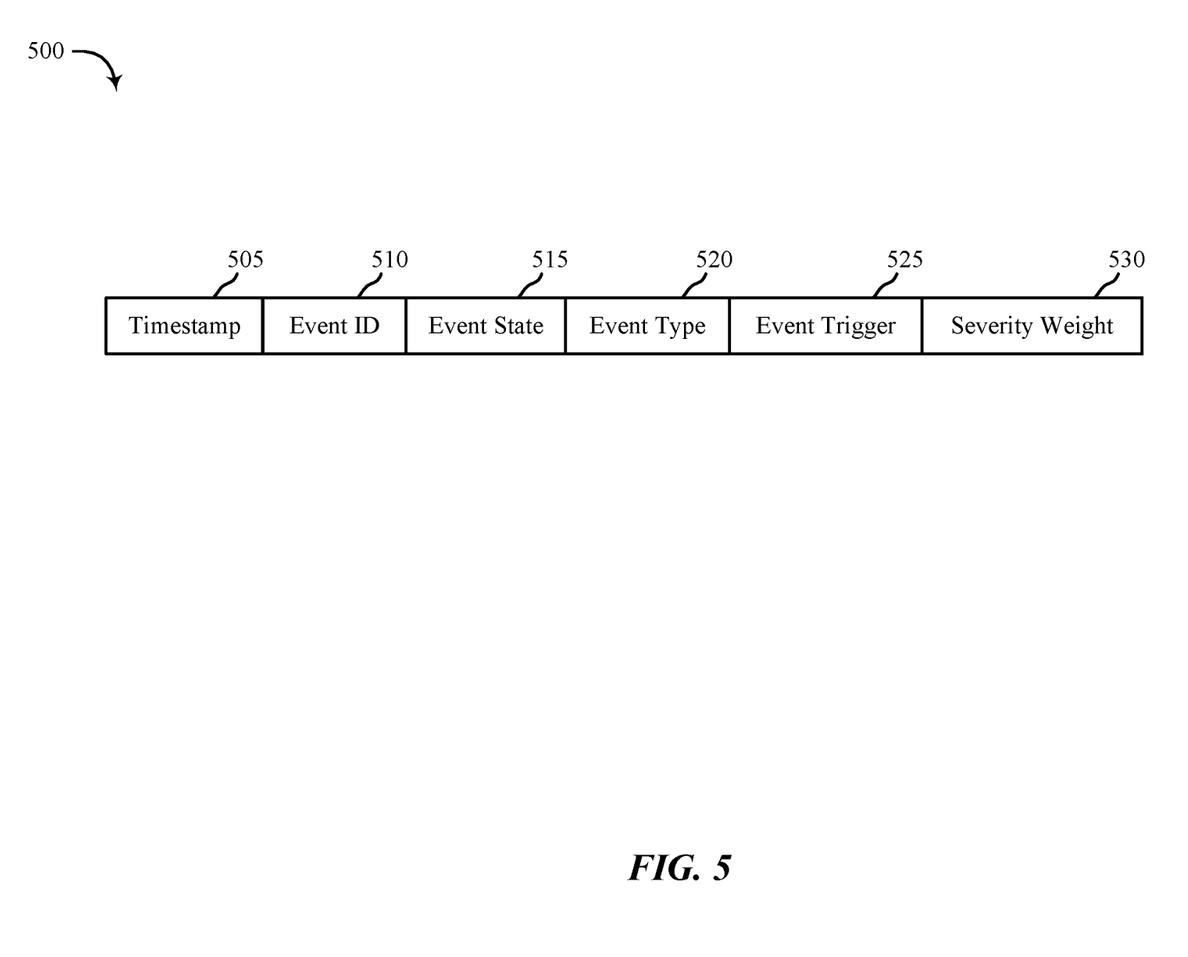
FIG. 5 shows one embodiment of an environment in accordance with various aspects of this disclosure.

FIG. 5 shows an event 500 for improving data mining systems, in accordance with various examples. At least one aspect of event 500 may be implemented in conjunction with device 105 of FIG. 1, apparatus 205 of FIG. 2, and/or data mining module 130 depicted in FIGS. 1, 2, 3, and/or 4.

Each event logged by a server may include at least one of a timestamp, an event identifier, a state of an event, an event type, a trigger of the event, a severity weight applied to the state that indicates a stability of the given state, or any combination thereof. In the illustrated example, event 500 may include timestamp field 505, event ID field 510, event state field 515, event type field 520, event trigger field 525, and severity weight field 525. In some cases, although the fields of event 500 are shown in a particular order, the fields of event 500 may be stored in any possible order.

Each event such as event 500 may cause a transition of state in relation to an associated server such as a storage server. A series of events may be related to a parent state, an initial state, or start state. Thus, a certain sequence of events may include at least one of a start state and an end state. In some cases, the start state and the end state may be the same state. In some cases, a sequence of events may include a start state, one or more intermediary states, and an end state. In some examples, a sequence of related events may be referred to as a flow of related events. In some cases, a flow of related events may be referred to as a start state being transformed into an end state. In some cases, a flow of related events includes one or more intermediary states that form part of the transformation from start state to end state. A flow of events may be represented in at least one of a matrix representation and a state flow diagram, or any combination thereof.

Figure 6:
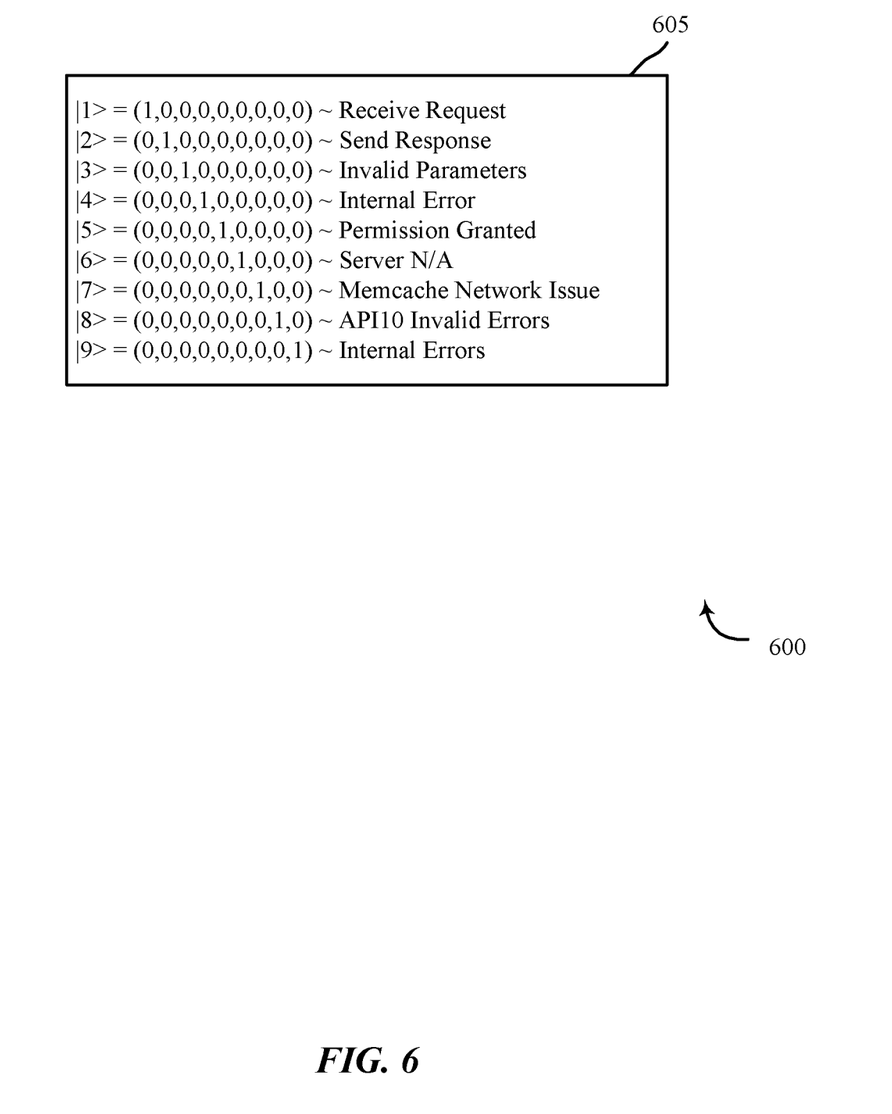
FIG. 6 shows another embodiment of an environment in accordance with various aspects of this disclosure.

FIG. 6 shows an event data 600 for improving data mining systems, in accordance with various examples. Event data 600 may include one or more events. For example, event data 600 may include at least one event configured with one or more fields from event 500 of FIG. 5. At least one aspect of event data 600 may be implemented in conjunction with device 105 of FIG. 1, apparatus 205 of FIG. 2, and/or data mining module 130 depicted in FIGS. 1, 2, 3, and/or 4.

As depicted, event data 600 may depict a flow of events represented in a matrix representation. In some cases, an event identifier may be associated with event data 600. In some cases, the event identifier may include a hexadecimal value. As one example, an event identifier such as d8bdfdce2e9c may be associated with event data 600. In some cases, a transition matrix element in a jth row and ith column, $P_{ji}$, i,j=1, ... , 9, describes the probability of going from state |i> to state |j>. As an example, the possible subsequent states from |1> may be |2>, |3>, or |5> with equal probabilities and nowhere else. In such a case, the probability of going from |1> to |1> may be zero, while the probability of going from |1> to |2> may be 1 in 3. Accordingly, $P_{11}=0$; $P_{21}=\frac{1}{3}$; $P_{31}=\frac{1}{3}$; $P_{41}=0$; $P_{51}=\frac{1}{3}$; $P_{61}=0$; ... $P_{91}=0$. In this example $P_{ij}|1>=\frac{1}{3}(|2>+|3>+|5>)$, where the matrix transforms state |1> into a superposition of other states.

In some embodiments, an accurate and reliable transition matrix may be generated in conjunction with sustained testing of certain systems and associated events, system telemetry, analysis of data and/or telemetry data, or any combination thereof. In some embodiments, upon generating a transition matrix a computing system may statistically predict the state of any associated system after N transitions.

Figure 7:
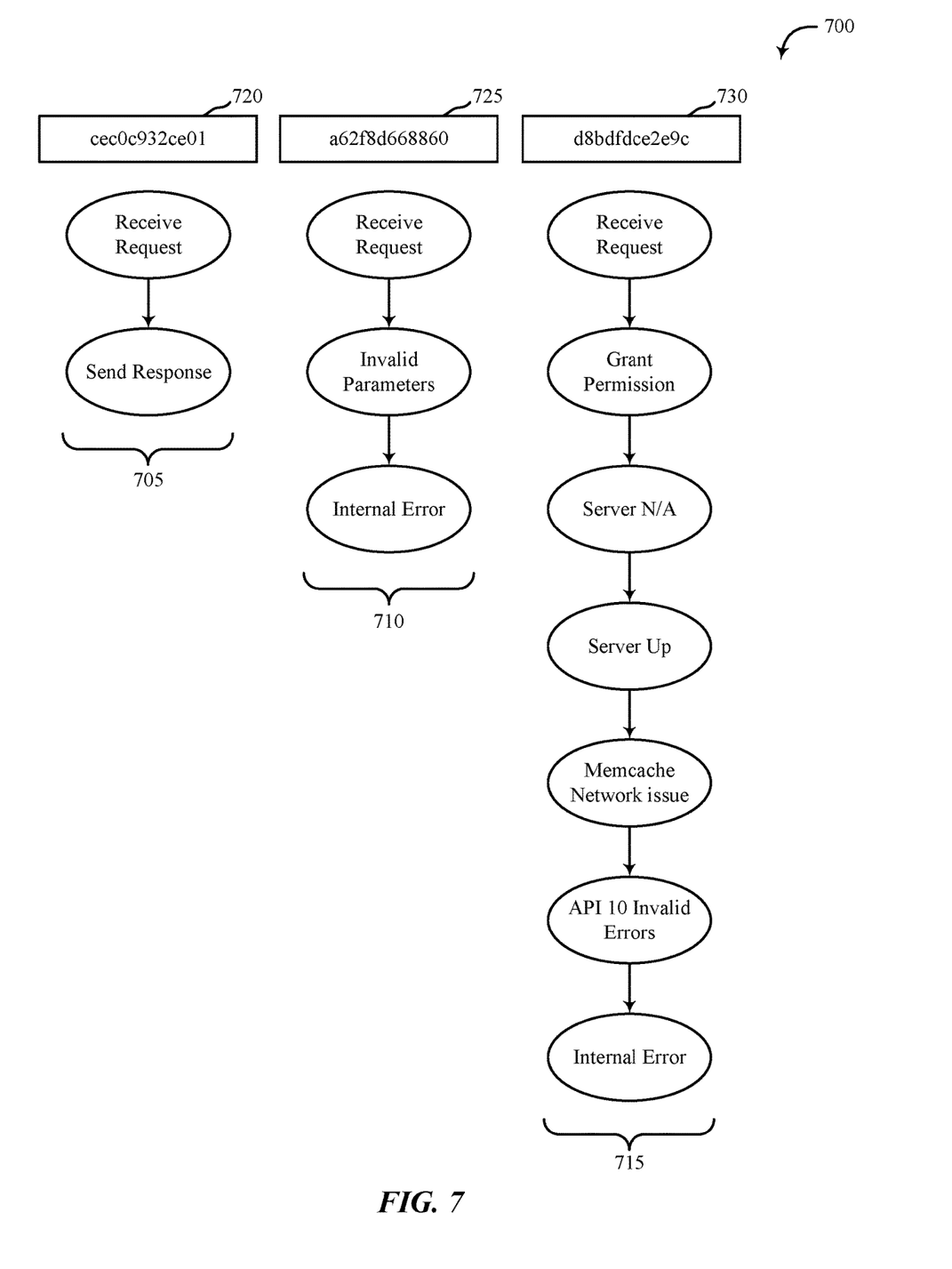
FIG. 7 shows another embodiment of an environment in accordance with various aspects of this disclosure.

FIG. 7 shows an event data 700 for improving data mining systems, in accordance with various examples. Event data 700 may be one example of event data 600 of FIG. 6. Event data 700 may include one or more events. For example, event data 700 may include at least one event configured with one or more fields from event 500 of FIG. 5. At least one aspect of event data 700 may be implemented in conjunction with device 105 of FIG. 1, apparatus 205 of FIG. 2, and/or data mining module 130 depicted in FIGS. 1, 2, 3, and/or 4.

As depicted, event data 700 may depict a flow of events represented in a state flow diagram representation. In some embodiments, each flow of events may include one or more events. In the illustrated example, each state flow may include a may include a sequence of events. In some cases, each state flow may include a start state, one or more intermediary states, and an end state. In some cases, each state flow may include at least a start state and an end state. In some embodiments, the start state includes the end state.

In the illustrated example, event data 700 may include a first state flow of events 705, a second state flow of events 710, and a third state flow of events 715. Although three state flow of events are shown in event data 700, event data 700 may include more or less state flows.

As shown, first flow of events 705 may include a start state of "Receive Request," an end state of "Send Response," no intermediary states, and an event identifier 720. Also as shown, second flow of events 710 may include a start state of "Receive Request," an intermediary state of "Invalid Parameters," an end state of "Internal Error," and an event identifier 725. Similarly, third flow of events 715 may include a start state of "Receive Request," intermediary states of "Grant Permission," "Server Not Available," "Server Up," "MemCache Network Issue," and "API 10 Invalid Errors," an end state of "Internal Error," and an event identifier 730.

In some embodiments, a storage server may monitor events and generate the state flows 705, 710, and 715 of event data 700 based on the events detected. In some examples, a computing device may send a request to the storage server and the storage server may provide data such as state flows 705, 710, and/or 715 to the requesting device. In some cases, the requesting device may request events involving "MemCache Network Issues." In the illustrated example, only the third state flow of events 715 includes such an event. Accordingly, the storage server may send the third state flow of events 715 in response to the request and/or any data related to the third state flow of events 715.

Figure 8:
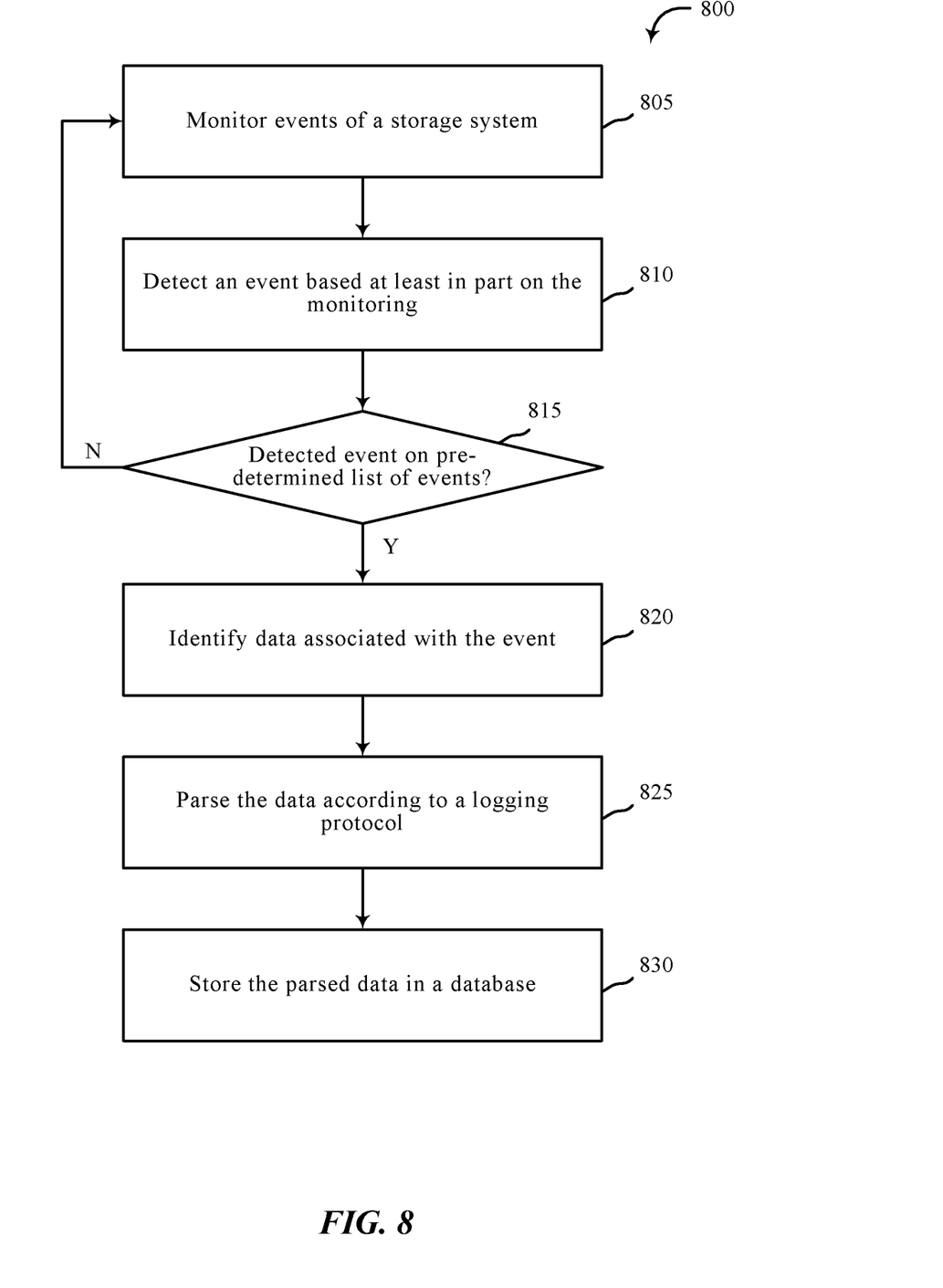
FIG. 8 is a flow chart illustrating an example of a method in accordance with various aspects of this disclosure.

FIG. 8 is a flow chart illustrating an example of a method 800 for improving data mining systems, in accordance with various aspects of the present disclosure. One or more aspects of the method 800 may be implemented in conjunction with device 105 of FIG. 1, apparatus 205 of FIG. 2, and/or data mining module 130 depicted in FIGS. 1, 2, 3, and/or 4. In some examples, a backend server, computing device, and/or storage device may execute one or more sets of codes to control the functional elements of the backend server, computing device, and/or storage device to perform one or more of the functions described below. Additionally or alternatively, the backend server, computing device, and/ or storage device may perform one or more of the functions described below using special-purpose hardware.

At block 805, method 800 may include monitoring events of a storage system. At block 810, method 800 may include detecting an event. At block 815, method 800 may include determining whether the detected event is on a list of predetermined events. Upon determining the detected event is not on the list of predetermined events, method 800 may return to monitoring events at block 805. Upon determining the detected event is on the list of predetermined events, at block 820, method 800 may include identifying data associated with the event. At block 825, method 800 may include parsing the data according to a logging protocol. At block 830, method 800 may include storing the parsed data in a database.

The operation(s) at block 805-830 may be performed using the data mining module 130 described with reference to FIGS. 1-4 and/or another module. Thus, the method 800 may provide for improving data mining systems relating to improving data mining systems. It should be noted that the method 800 is just one implementation and that the operations of the method 800 may be rearranged, omitted, and/or otherwise modified such that other implementations are possible and contemplated.

Figure 9:
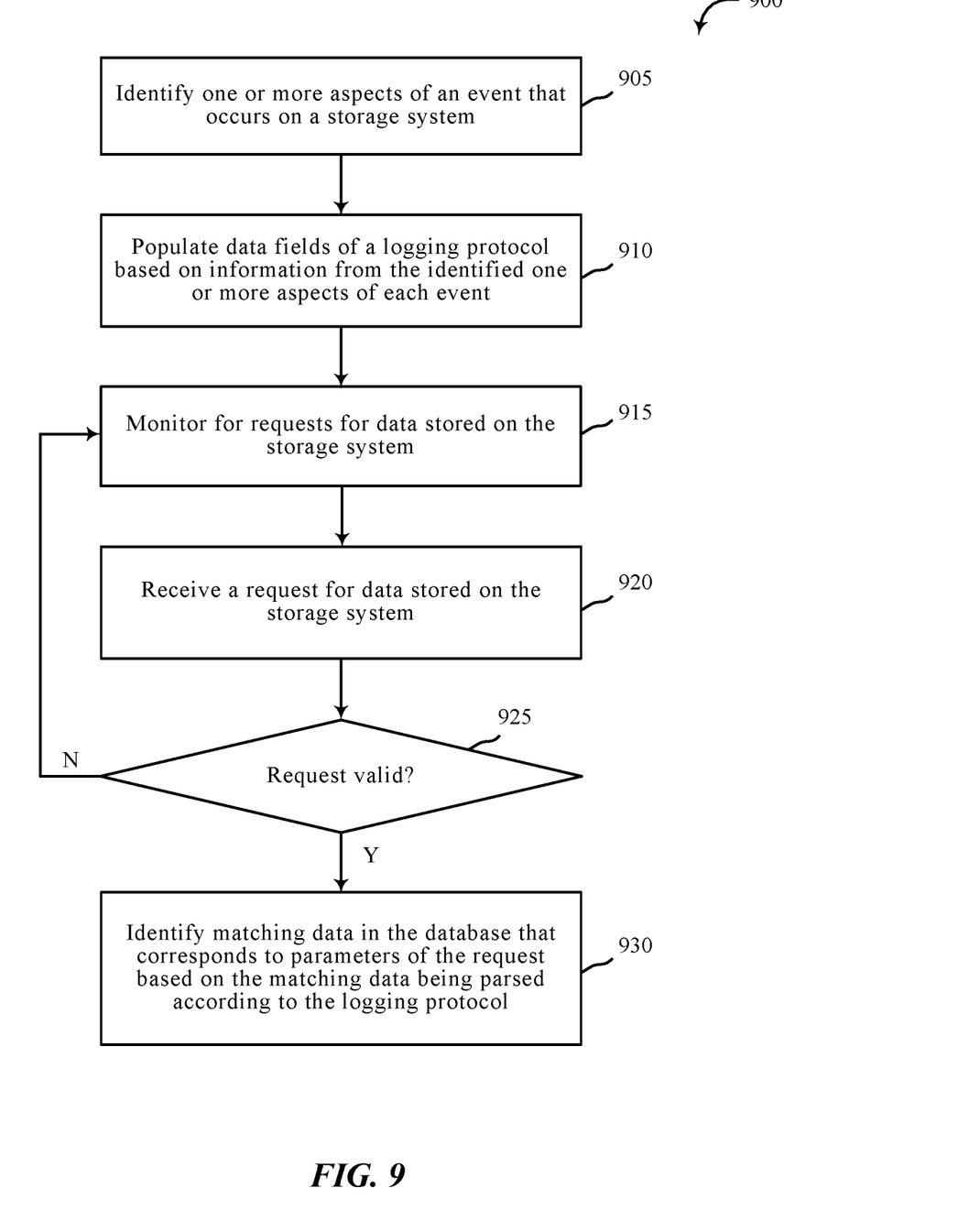
FIG. 9 is a flow chart illustrating an example of a method in accordance with various aspects of this disclosure.

FIG. 9 is a flow chart illustrating an example of a method 900 for improving data mining systems, in accordance with various aspects of the present disclosure. One or more aspects of the method 900 may be implemented in conjunction with device 105 of FIG. 1, apparatus 205 of FIG. 2, and/or data mining module 130 depicted in FIGS. 1, 2, 3, and/or 4. In some examples, a backend server, computing device, and/or storage device may execute one or more sets of codes to control the functional elements of the backend server, computing device, and/or storage device to perform one or more of the functions described below. Additionally or alternatively, the backend server, computing device, and/or storage device may perform one or more of the functions described below using special-purpose hardware.

At block 905, method 900 may include identifying one or more aspects of at least one event that occurs on a storage system. In some cases, method 900 may identify one or more aspects of each event in a group of events. In some cases, method 900 may continuously identify aspects of events as events occur in relation to a system monitored by method 900. At block 910, method 900 may include populating data fields of a logging protocol based on information from the identified one or more aspects of each event. For each event the information gleaned from the identified one or more aspects may include at least one of a timestamp of an event, an event identifier, a state of an event, an event type, a trigger of the event, a severity weight applied to the state that indicates a stability of the given state, or any combination thereof.

At block 915, method 900 may include monitoring requests for data stored on the storage system. At block 920, method 900 may include receiving a request for data stored on the storage system. At block 925, method 900 may include determining whether the received request is valid. Upon determining the request is not valid, method 900 may return to monitoring for requests at block 915. Upon determining the request is valid, at block 930, method 900 may include identifying matching data in the database that corresponds to one or more parameters of the request based at least in part on the matching data being parsed according to the logging protocol.

The operations at blocks 905-930 may be performed using the data mining module 130 described with reference to FIGS. 1-4 and/or another module. Thus, the method 900 may provide for improving data mining systems relating to improving data mining systems. It should be noted that the method 900 is just one implementation and that the operations of the method 900 may be rearranged, omitted, and/or otherwise modified such that other implementations are possible and contemplated.

In some examples, aspects from two or more of the methods 800 and 900 may be combined and/or separated. It should be noted that the methods 800 and 900 are just example implementations, and that the operations of the methods 800 and 900 may be rearranged or otherwise modified such that other implementations are possible.

The detailed description set forth above in connection with the appended drawings describes examples and does not represent the only instances that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with this disclosure may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, and/or state machine. A processor may also be implemented as a combination of computing devices, for example, a combination of a DSP and a microprocessor, multiple microprocessors, one or more microprocessors in conjunction with a DSP core, and/or any combination thereof.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC, or A and B and C.

In addition, any disclosure of components contained within other components or separate from other components should be considered exemplary because multiple other architectures may potentially be implemented to achieve the same functionality, including incorporating all, most, and/or some elements as part of one or more unitary structures and/or separate structures.

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM, DVD, or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, or any combination thereof, then the coaxial cable, fiber optic cable, twisted pair, DSL, or wireless technologies such as infrared, radio, and/or microwave are included in the definition of medium. Disk and disc, as used herein, include any combination of compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed.

This disclosure may specifically apply to security system applications. This disclosure may specifically apply to storage system applications. In some embodiments, the concepts, the technical descriptions, the features, the methods, the ideas, and/or the descriptions may specifically apply to storage and/or data security system applications. Distinct advantages of such systems for these specific applications are apparent from this disclosure.

The process parameters, actions, and steps described and/or illustrated in this disclosure are given by way of example only and can be varied as desired. For example, while the steps illustrated and/or described may be shown or discussed in a particular order, these steps do not necessarily need to be performed in the order illustrated or discussed. The various exemplary methods described and/or illustrated here may also omit one or more of the steps described or illustrated here or include additional steps in addition to those disclosed.

Furthermore, while various embodiments have been described and/or illustrated here in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may permit and/or instruct a computing system to perform one or more of the exemplary embodiments disclosed here.

This description, for purposes of explanation, has been described with reference to specific embodiments. The illustrative discussions above, however, are not intended to be exhaustive or limit the present systems and methods to the precise forms discussed. Many modifications and variations are possible in view of the above teachings. The embodiments were chosen and described in order to explain the principles of the present systems and methods and their practical applications, to enable others skilled in the art to utilize the present systems, apparatus, and methods and various embodiments with various modifications as may be suited to the particular use contemplated.

What is claimed is:

1. A storage system comprising:
   a storage drive; and
   a hardware controller configured to:
      detect a first event in the storage system,
      identify data associated with the first event,
      determine whether the detected first event is included in a predetermined list of events,
      parse the data according to a logging protocol,
      store the parsed data in a database when the detected first event is included in the predetermined list of events,
      bypass the parsing of the data according to the logging protocol and the storing of the parsed data in the database when the detected first event is not included in the predetermined list of events,
      determine a probability of a second event occurring based on the first event occurring, and
      assign a severity to one or more of the first or second event, a state of the first or second event, and a sequence of events including the first and second event, wherein the assigned severity based at least in part on a degree to which the one or more of the first or second event, the state of the first or second event, and the sequence of events affects an operation of the storage drive or a related system.

2. The storage system of claim 1, wherein parsing the data according to the logging protocol includes at least one of assigning a timestamp to the first event, assigning an event identifier to the first event, determining the state of the first event, determining an event type of the first event, determining a trigger of the first event, and determining the severity associated with the first event, or any combination thereof.

3. The storage system of claim 2, wherein the state of the first event includes at least one of a start state, an end state, and an intermediary state.

4. The storage system of claim 3, wherein the intermediary state is a default state.

5. The storage system of claim 2, wherein the severity associated with the first event is based at least in part on a degree to which the first event affects an operation of the storage drive.

6. The storage system of claim 1, wherein the logging protocol includes one or more parameters in a predetermined sequence.

7. The storage system of claim 1, wherein the hardware controller is configured to:
detect in real time the second event, wherein the second event occurs as a result of the first event.

8. The storage system of claim 7, wherein the hardware controller is configured to:
determine a probability of a third event occurring based on the first and second events occurring;
detect in real time the third event; and
determine the state of the first event is a start state, the state of the second event is an intermediary state, and a state of the third event is in an end state, wherein the first, second, and third events comprise a flow of related events.

9. The storage system of claim 1, wherein the hardware controller is configured to:
receive a request with one or more parameters; and
identify matching data in the database that corresponds to the one or more parameters of the request based at least in part on the matching data being parsed according to the logging protocol.

10. A non-transitory computer-readable storage medium storing computer executable instructions to improve a storage system that when executed by a processor cause the processor to perform the steps of:
detecting a first event in the storage system;
identifying data associated with the first event;
determining whether the detected first event is included in a predetermined list of events that adversely affect operation of a drive of the storage system;
parsing the data according to a logging protocol and storing the parsed data in a database when the detected first event is included in the predetermined list of events;
bypassing the parsing of the data according to the logging protocol and the storing of the parsed data in the database when the detected first event is not included in the predetermined list of events; and
assigning a severity to one or more of the first or second event, a state of the first or second event, and a sequence of events including the first and second event, wherein the assigned severity based at least in part on a degree to which the one or more of the first or second event, the state of the first or second event, and the sequence of events affects an operation of the storage drive or a related system.

11. The storage medium of claim 10, wherein parsing the data according to the logging protocol includes at least one of assigning a timestamp to the first event, assigning an event identifier to the first event, determining the state of the first event, determining an event type of the first event, determining a trigger of the first event, and determining the severity associated with the first event, or any combination thereof.

12. The storage medium of claim 11, wherein the state of the first event includes at least one of a start state, an end state, and an intermediary state.

13. The storage medium of claim 12, wherein the intermediary state is a default state.

14. The storage medium of claim 11, wherein the severity associated with the first event is based at least in part on a degree to which the first event affects an operation of the storage drive.

15. The storage medium of claim 10, wherein the logging protocol includes one or more parameters in a predetermined sequence.

16. The storage medium of claim 10, the processor to perform the steps of:
determining a probability of the second event occurring based on the first event occurring; and
detecting in real time the second event in relation to the storage system, wherein the second event occurs as a result of the first event.

17. The storage medium of claim 10, the processor to perform the steps of:
determine a probability of a third event occurring based on the first and second events;
detect in real time the third event in relation to the storage system; and
determine the state of the first event is a start state, the state of the second event is an intermediary state, and a state of the third event is in an end state, wherein the first, second, and third events comprise a flow of related events.

18. A method to improve a storage system comprising:
detecting a first event in the storage system;
identifying data associated with the first event;
determining whether the detected first event is included in a predetermined list of events;
parsing the data according to a logging protocol and storing the parsed data in a database when the detected first event is included in the predetermined list of events;
bypassing the parsing of the data according to the logging protocol and the storing of the parsed data in the database when the detected first event is not included in the predetermined list of events;
determining a probability of a second event occurring based on the first event occurring; and
assigning a severity to one or more of the first or second event, a state of the first or second event, and a sequence of events including the first and second event, wherein the assigned severity based at least in part on a degree to which the one or more of the first or second event, the state of the first or second event, and the sequence of events affects an operation of the storage drive or a related system.

19. The method of claim 18, wherein parsing the data according to the logging protocol includes at least one of assigning a timestamp to the first event, assigning an event identifier to the first event, determining the state of the first event, determining an event type of the first event, determining a trigger of the first event, and determining the severity associated with the first event, or any combination thereof.

* * * * *